J. W. H. DEW.
MACHINE FOR MANUFACTURING MATERIAL FROM ADHESIVES AND FIBERS.
APPLICATION FILED MAY 18, 1914.
1,241,938.
Patented Oct. 2, 1917.
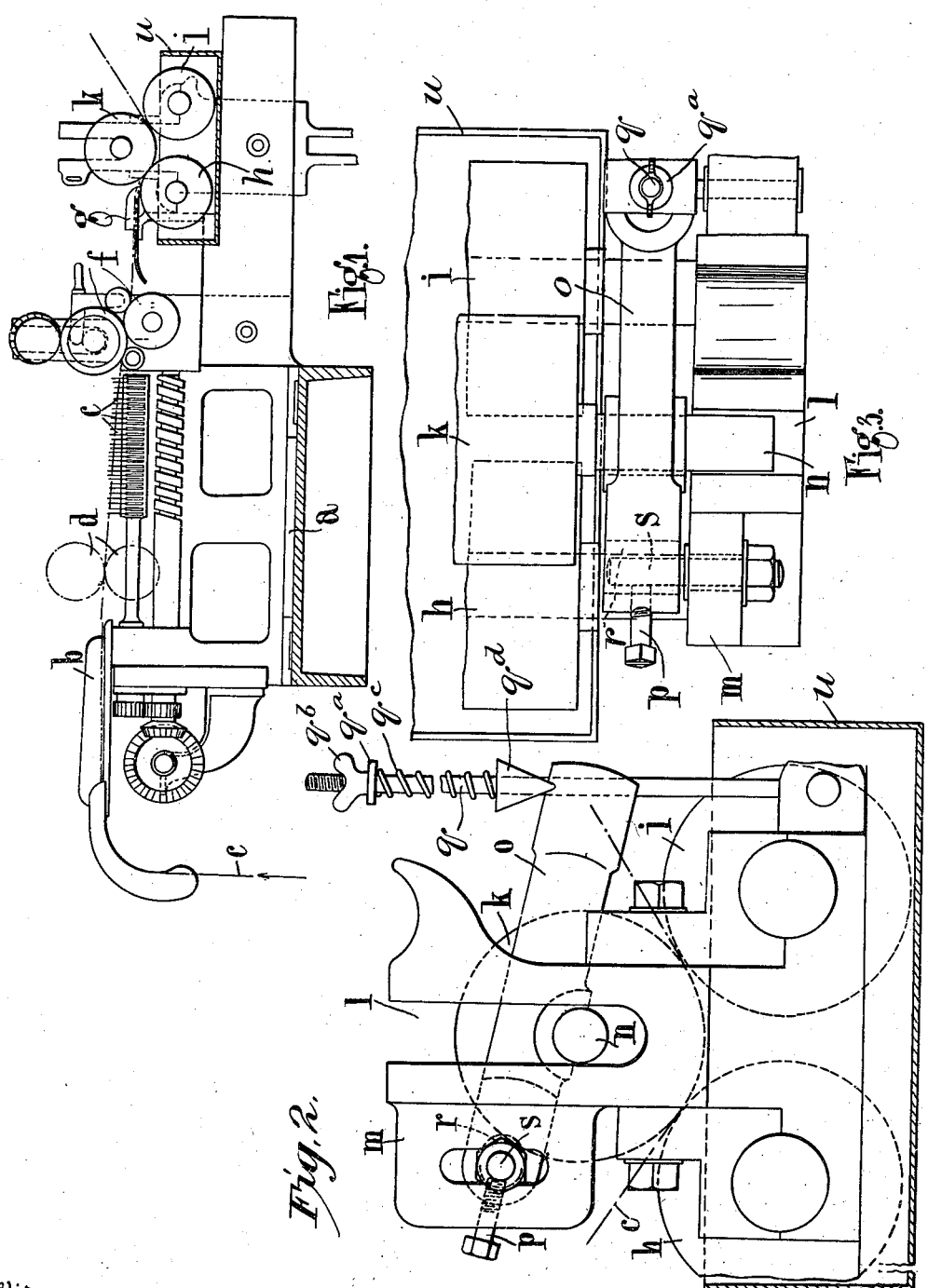
Witnesses
Roland T. Booth
Inventor
James W. H. Dew.
By H. B. Wilson & Co.
Attorneys

UNITED STATES PATENT OFFICE.

JAMES WALTER HENRY DEW, OF LONDON, ENGLAND, ASSIGNOR TO THE AZULAY SYNDICATE LIMITED, OF LONDON, ENGLAND.

MACHINE FOR MANUFACTURING MATERIAL FROM ADHESIVES AND FIBERS.

1,241,938.  Specification of Letters Patent.  Patented Oct. 2, 1917.

Application filed May 18, 1914. Serial No. 839,384.

*To all whom it may concern:*

Be it known that I, JAMES WALTER HENRY DEW, a subject of the King of Great Britain and Ireland, and residing at 8 Laurence Pountney Hill, Cannon street, London, E. C., England, have invented certain new and useful Improvements in Machines for Manufacturing Material from Adhesives and Fibers, of which the following is a specification.

This invention relates to improvements in machines for manufacturing material for making pneumatic tires, tire treads, waterproof sheeting, tubing and other like goods formed from rubber or other adhesive and fibers particularly such articles as are formed from strips or bands of fibers impregnated with adhesive, the invention being particularly though not solely applicable for producing such strips or bands as are approximately one fiber thick.

The object of the present invention is to devise a machine capable of rapidly turning out coherent strips of uniform width and thickness in which the individual fibers are caused to adhere firmly to their neighbors by reason of their thorough impregnation with adhesive.

The invention consists in a machine in which the fibers are passed between feed rollers working in the required adhesive such that the first set of surfaces between which the fibers pass are in contact with one another while the discharging roller surfaces are slightly out of contact.

The invention also consists in the provision of means for adjusting the position of the rollers in relation to one another.

The invention further consists in other details and arrangements hereinafter more particularly referred to.

The accompanying drawings illustrate one mode of carrying out the invention.

Figure 1 shows more or less diagrammatically one convenient form of machine constructed in accordance with the invention.

Figs. 2 and 3 are respectively a side elevation and a half plan illustrating on a larger scale a portion of the machine shown in Fig. 1.

In carrying my invention into effect in one convenient manner I provide any usual or convenient form of framing or stand $a$ upon which are arranged guides $b$ for the fibers $c$, fluted or other suitable breaking-down rollers $d$ and combing devices of any usual form $e$, the whole of the parts so far described being well known and being modified in any desired manner to suit the nature of the fibers employed or any other practical requirements. The fibers after being arranged practically parallel by means of the devices above referred to are caused to pass through further rollers $f$ whereupon they enter a suitable guide $g$ before passing to the bath of adhesive contained in tank $u$, the guide $g$ being of convenient size and shape depending upon the dimensions of band or strip that is required.

In the form of machine illustrated in the drawings the feed rollers that work in the bath of adhesive are three in number $h$ $i$ and $k$, the rollers being mounted in suitable bearings such that the roller $k$ is arranged above the rollers $h$ and $i$, the two latter being immersed or partially immersed in the bath of adhesive solution. The fiber passes between the contacting feed rollers $h$ and $k$ and becomes thoroughly impregnated with the adhesive solution, and the distance between $i$ and $k$ regulates the quantity of adhesive necessary for the various purposes and I have found that in order to obtain successful results I must be able to adjust the feed rollers so that the rollers $h$ and $k$ are in contact with one another and under the required pressure while there is a small amount of clearance between the rollers $k$ and $i$ as shown more clearly in Fig. 2.

In one convenient method of effecting this adjustment the upper roller $k$ is mounted in slots $l$ in side brackets $m$ and the spindle $n$ is adapted to be grasped by arms or levers $o$ pivoted upon the machine and so mounted that they can be adjusted in the slots $r$ in the arms $o$ by means of set screws $p$ or like devices screwed into the ends of the arms $o$ and adapted to abut against fixed screws or the like $s$ so that by means of the set screws the roller $k$ can be given a side-way movement so that its position in relation to the rollers $h$ and $i$ and the degree of contact and amount of clearance that is to be left may be varied as desired to suit the band that is being formed and the nature of the adhesive employed. The upper roller $k$ is held in position by the contact between the lower rollers $h$ and the arms or the like $o$. The arms $o$ may be held in position by the pivoted members $q$ so that they may be readily moved out of contact with the roller spindle $n$ when required. The members $q$ which are pivoted on the frame $a$ are each shown in the form of an upright, the upper end of which extends through a supporting plate $q^a$ and is threaded and provided above said plate with a wing nut $q^b$. A coiled spring $q^c$ encircles the upright below the plate $q^a$ bearing at one end against said plate and at its other end on a wedge-shaped member $q^d$ the knife edge of which engages the end of arm $o$ opposite to that with which screw $p$ is engaged (see Fig. 2). It will thus be seen that the arm $o$ is yieldably engaged with the member $q$ and that the tension of the spring $q^c$ may be varied by adjusting the nut $q^b$. It is to be understood that the above constructional details are given by way of example only and the method of mounting and adjusting the rollers and the number of rollers employed may be suitably modified to suit any given requirements.

Having now described my invention, what I claim as new and desire to secure by Letters Patent is:—

1. A machine for forming articles or material of adhesive and fiber comprising fiber feeding mechanism, a receptacle for liquid adhesive, two rollers arranged within said receptacle and over which said fiber passes, and a third coöperating roller yieldingly mounted above said two rollers in such a manner that the space between the third roller and the lower roller at the discharge side of the machine is always slightly greater than that between said third roller and the lower roller at the entering side of the machine.

2. A machine for forming articles or material of adhesive and fiber comprising fiber feeding mechanism, a receptacle for liquid adhesive, two feed rollers arranged within said receptacle, a third coöperating feed roller yieldingly mounted above said two rollers in such a manner that the space between the third roller and the lower roller at the discharge side of the machine is always slightly greater than that between said third roller and the lower roller at the entering side of the machine, and means for moving said roller to adjust the degree of pressure against and clearance from the respective lower rollers.

3. A machine for forming articles or material of adhesive and fiber comprising fiber feeding mechanism, a receptacle for liquid adhesive, two feed rollers arranged within said receptacle, a third feed roller mounted above said two rollers and arranged so that it is in contact with one roller and slightly out of contact with the second roller, a movable link embracing the spindle of said upper roller and screw-operated means for moving said link for the purpose of adjusting the position of the upper roller relatively to the lower rollers.

In testimony whereof I have signed my name to this specification in the presence of two subscribing witnesses.

JAMES WALTER HENRY DEW.

Witnesses:
 B. WHEATON,
 A. HOOPER.